Patented June 13, 1939

2,161,975

UNITED STATES PATENT OFFICE 2,161,975

TITANIUM DIOXIDE PIGMENTS

Karl Walter Petersen, Stockholm, Sweden, assignor to I. G. Farbenindustrie Aktiengesellschaft, Frankfort-on-the-Main, Germany No Drawing. Application January 8, 1937, Serial No. 119,625. In Germany January 25, 1936

9 Claims. (Cl. 134—58)

This invention relates to titanium pigments. It has particular reference to titanium dioxide possessing improved properties in respect to light- and weather-resistance, as well as other desirable properties.

An object of this invention is the preparation of titanium dioxide pigments possessing improved pigment properties, particularly improved resistance to weathering. Another object of this invention is the preparation of titanium dioxide possessing increased resistance against the action of light. Still another object of this invention is the preparation of titanium dioxide pigments which are substantially free, as compared with ordinary titanium pigments, from a tendency to cause the bleaching of organic dyestuffs.

In accordance with the present invention the process of manufacture of titanium dioxide pigments comprises the step of treating the same with a solution of a basic aluminium salt.

Among the basic aluminium salts adapted for use in the process of the present invention highly basic aluminium salts such as for example the highly basic chloride, bromide, iodide, formiate and acetate may be employed with particular advantage, such highly basic aluminium salts being obtainable for example according to the processes described in the paper by A. Müller, Journal für anorganische Chemie, volume 57, 1908, page 311 et seq., and in the paper by M. Adolf and W. Pauli in the "Kolloid-Journal", volume 29, (1921), part 6, page 282 et seq., furthermore in Gmelin, Handbuch der anorganischen Chemie 8th edition, delivery 1, part B, page 205-206, as well as in "Bulletin de la Société Chimique de France" (3), 13, 1895, seite 56, by E. Schlumberger.

A typical method of preparing basic aluminium chloride is described in Gmelin l. c., according to which upon dissolution of freshly precipitated Al(OH)$_3$ in AlCl$_3$ solutions or upon addition to the AlCl$_3$ solutions of Na$_2$CO$_3$, solutions of basic aluminum chloride are obtained, the composition of which, depending upon the added amount of hydroxide, may be expressed by the formulae Al$_2$Cl$_5$OH, Al$_2$Cl$_4$(OH)$_2$, Al$_2$Cl$_3$(OH)$_3$, and Al$_2$Cl$_2$(OH)$_4$.

In general it is sufficient to employ these salts in the form of a very dilute solution. However, the concentration of the solution should be so adjusted that even on prolonged standing no turbidity caused by separated aluminium hydroxides occurs. In general the concentration of the solution may vary between a content of about 0.2% and about 50% of basic aluminium salt. When employing distilled water or water substantially freed by other means from hardness the desired effect is attained even with a 0.1% solution of basic aluminium chloride in the softened water.

The temperature during the reaction may vary according to the conditions. I have obtained good results at a temperature above 0° C. and especially at a temperature from about 0° C. to about 100° C., more particularly with temperatures ranging from about 15° C. to about 25° C.

The calcined and ground titanium dioxide is stirred in a suitable manner in the aluminium salt solution for about 1 to about 4 hours. The mixture is filtered, the residue thoroughly washed with water and finally dried. Instead of the calcined titanium dioxide also the uncalcined hydrous titanium oxide is applicable for the process of this invention. Furthermore previously prepared composite pigment of titanium dioxide with for example barium sulfate or calcium sulfate may be employed for this purpose. Titanium dioxide pigment thus obtained may be used as such or it may be mixed in the known manner with an extender, such as for example barium sulfate, calcium sulfate, calcium carbonate, zinc oxide and the like.

Prior to my invention it has been suggested to suspend titanium oxygen compounds in a solution of aluminium sulfate and to precipitate aluminium from such mixtures by the addition of an alkaline compound such as sodium carbonate, sodium hydroxide, ammonium hydroxide and the like. My invention, as will be readily perceived, is distinguished from such procedure, not only by fact the I do not use an alkaline neutralising or precipitating agent, but also by the fact that I use a basic aluminium salt as distinguished from the normal aluminium salts suggested by the prior art.

The following examples will illustrate the invention; the parts being by weight:

Example 1

10 parts by weight of titanium dioxide are stirred for 3 hours at room temperature with 80 parts by weight of a clear, 0.1% solution of a highly basic aluminium chloride containing approximately one equivalent of chlorine per 2 atoms of aluminium, filtered, thoroughly washed and dried at 150° C.

Example 2

10 parts by weight of titanium dioxide are stirred for 3 hours at room temperature with 80 parts by weight of a clear, 1% solution of a highly basic aluminium nitrate, filtered, thoroughly washed and dried at 150° C.

Example 3

10 parts by weight of titanium dioxide are stirred for 4 hours at 25° C. with 80 parts by weight of a clear, 5% solution of a highly basic aluminium formiate, filtered, thoroughly washed and dried at 150° C.

Example 4

100 parts by weight of titanium dioxide are stirred with 500 parts of water. This mixture is added with such an amount of basic aluminium acetate which corresponds to 0.7 part by weight of $Al_2O_3$. Then the mixture is heated to 70° C. and stirred for 1 hour. The pigment is filtered off, washed and dried at 150° C.

Example 5

100 parts by weight of hydrous titanium oxide are stirred for 3 hours at room temperature with 500 parts by weight of a clear, 0.1% solution of a highly basic aluminium chloride containing approximately one equivalent of chlorine per 2 atoms of aluminium. After filtering and washing the pigment is calcined in the usual manner.

Example 6

100 parts by weight of a composite pigment of 50 parts by weight of titanium dioxide and 50 parts by weight of barium sulfate are stirred for 3 hours at room temperature with 80 parts by weight of a clear, 0.1% solution of a highly basic aluminium chloride containing approximately one equivalent of chlorine per 2 atoms of aluminium, filtered, thoroughly washed and dried at 150° C.

I claim:

1. In the process for the improvement of titanium dioxide for use as a pigment, the step which comprises stirring titanium dioxide with a solution of a basic aluminium salt.

2. In the process for the improvement of titanium dioxide for use as a pigment, the step which comprises stirring titanium dioxide with a solution of a highly basic aluminium chloride.

3. In the process for the improvement of titanium dioxide for use as a pigment, the step which comprises stirring titanium dioxide with a solution of a highly basic aluminium chloride at a temperature of about 15 to about 25° C.

4. In the process for the improvement of titanium dioxide for use as a pigment, the step which comprises stirring 10 parts by weight of titanium dioxide for 3 hours at room temperature with 80 parts by weight of a 0.1% solution of a highly basic aluminium chloride containing approximately one equivalent of chlorine per 2 atoms of aluminium.

5. In the process for the improvement of titanium oxide for use as a titanium pigment, the step which comprises stirring hydrous titanium oxide with a solution of a basic aluminium salt.

6. In the process for the improvement of titanium oxide for use as a titanium pigment, the step which comprises stirring 100 parts by weight of hydrous titanium oxide for 3 hours at room temperature with 500 parts by weight of a 0.1% solution of a highly basic aluminium chloride containing approximately one equivalent of chlorine per 2 atoms of aluminium.

7. In the process for the improvement of a composite titanium dioxide pigment, the step which comprises stirring 10 parts by weight of a composite pigment consisting of 50 parts by weight of titanium dioxide and 50 parts by weight of barium sulfate for 3 hours at room temperature with 80 parts by weight of a 0.1% solution of a highly basic aluminium chloride containing approximately one equivalent of chlorine per 2 atoms of aluminium.

8. In the process for the improvement of titanium oxides for use as a pigment, the step which comprises stirring a compound of the group consisting of titanium dioxide and hydrous titanium oxide with a solution of a basic aluminum salt.

9. In the process for the improvement of titanium oxides for use as a pigment, the step which comprises stirring a compound of the group consisting of titanium dioxide and hydrous titanium oxide with a solution of a highly basic aluminum chloride.

KARL WALTER PETERSEN.